US007588606B2

(12) United States Patent
Hayashi et al.

(10) Patent No.: US 7,588,606 B2
(45) Date of Patent: Sep. 15, 2009

(54) COIN TYPE BATTERY AND MANUFACTURING METHOD THEREOF

(75) Inventors: Tetsuya Hayashi, Kadoma (JP);
Kazuyuki Hiranaga, Hirakata (JP);
Takahiro Teraoka, Hirakata (JP);
Shinichi Sakamoto, Neyagawa (JP);
Satoshi Ogawa, Kyotanabe (JP)

(73) Assignee: Panasonic Corporation, Osaka (JP)

( * ) Notice: Subject to any disclaimer, the term of this patent is extended or adjusted under 35 U.S.C. 154(b) by 731 days.

(21) Appl. No.: 11/374,685

(22) Filed: Mar. 13, 2006

(65) Prior Publication Data

US 2006/0154143 A1 Jul. 13, 2006

Related U.S. Application Data

(62) Division of application No. 10/381,503, filed as application No. PCT/JP02/08206 on Aug. 9, 2002, now Pat. No. 7,070,880.

(30) Foreign Application Priority Data

Aug. 10, 2001 (JP) ............... 2001-243425
Aug. 7, 2002 (JP) ............... 2002-230344

(51) Int. Cl.
*H01M 6/00* (2006.01)
(52) U.S. Cl. ............... 29/623.1; 29/623.2
(58) Field of Classification Search ............ 29/623.1, 29/623.2, 623.3; 429/94, 164, 128, 174
See application file for complete search history.

(56) References Cited

U.S. PATENT DOCUMENTS 5,478,672 A * 12/1995 Mitate ............... 429/224
5,635,138 A *  6/1997 Amatucci et al. ......... 422/104
5,776,628 A     7/1998 Kraft et al.
6,132,904 A * 10/2000 Kamino et al. .......... 429/306
6,132,906 A * 10/2000 Nishimura et al. ........ 429/326

FOREIGN PATENT DOCUMENTS

EP    1 079 454    2/2001
GB    1 073 017    6/1967

* cited by examiner

*Primary Examiner*—Raymond Alejandro
(74) *Attorney, Agent, or Firm*—Jordan and Hamburg LLP

(57) ABSTRACT

A positive electrode plate (11) and a negative electrode plate (12) are coiled around into a flat shape such that positive electrode layer faces (22a-22e) and negative electrode layer faces (23a-23f) are alternately layered upon one another with a separator interposed therebetween. Positional discrepancy detecting holes (41a, 41b, 42, 43, 44) are formed in the positive electrode layer faces (22a, 22b) and negative electrode layer face (23a) facing each other at the coiling start end, and in the positive electrode layer face (22e) and negative electrode layer face (23f) facing each other at the coiling finish end. The electrode plates are coiled into an electrode plate group, which is subjected to X-ray inspection for detecting positional displacement based on a discrepancy in the positions of the holes.

1 Claim, 10 Drawing Sheets

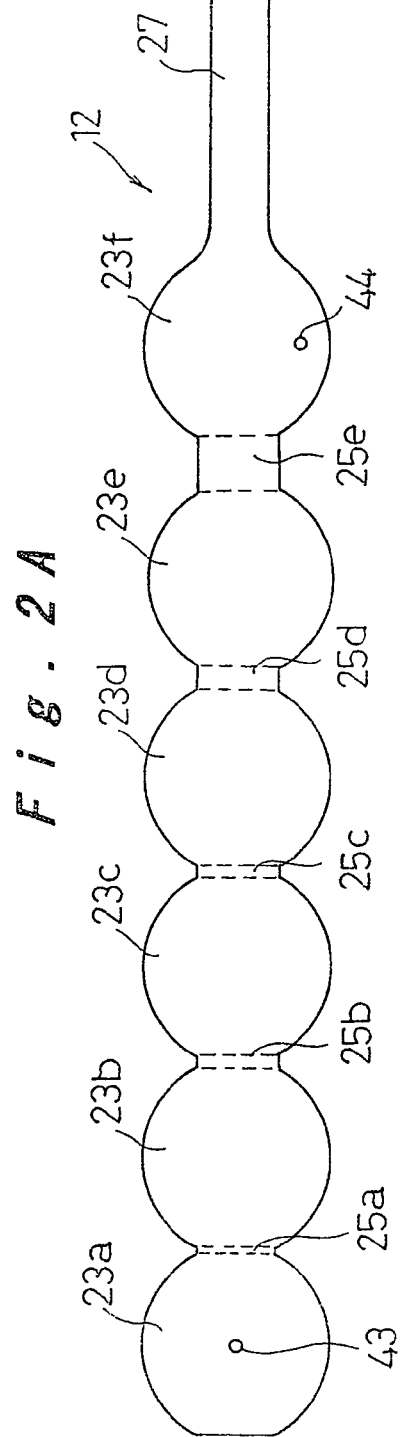
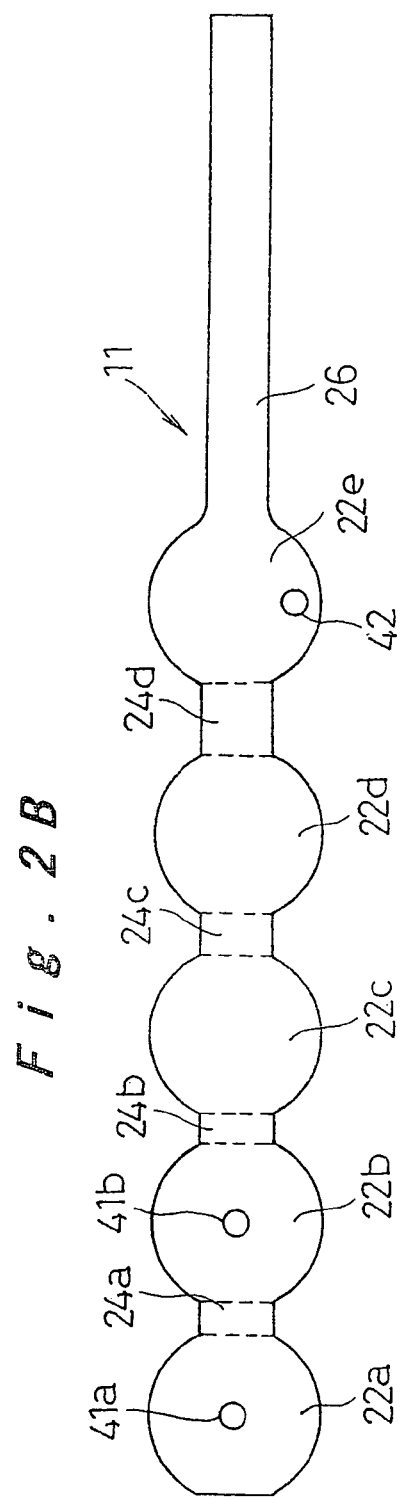

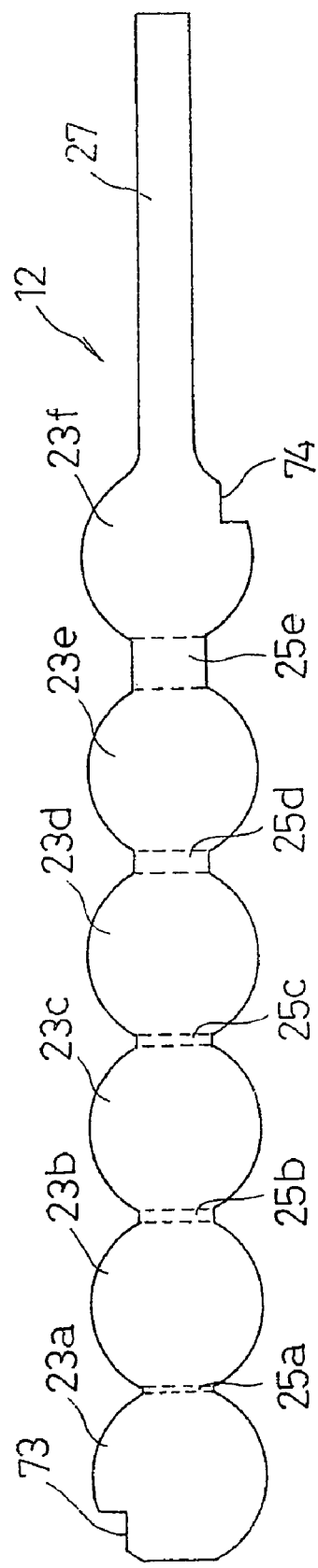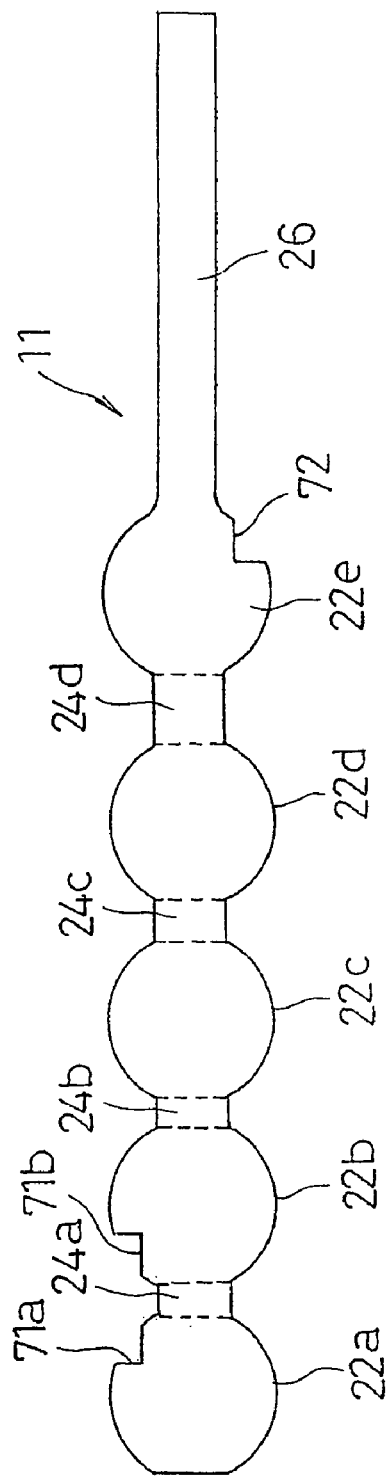

COIN TYPE BATTERY AND MANUFACTURING METHOD THEREOF

REFERENCE TO RELATED APPLICATION

This is a divisional of application Ser. No. 10/381,503, filed Apr. 10, 2003 now U.S. Pat. No. 7,070,880.

TECHNICAL FIELD

The present invention relates to a coin type battery and a manufacturing method thereof. The invention relates particularly to a coin type battery having an electrode plate group of a coiled structure constructed with a positive electrode plate, a negative electrode plate, and a separator interposed therebetween.

BACKGROUND ART

FIG. 9 illustrates the most commonly adopted electrode plate structure for coin type batteries, in which a disk-shaped positive electrode pellet 32 and a negative electrode pellet 33 are arranged face-to-face with a separator 34 interposed in between them. This coin type battery is manufactured through the following process steps to have the coin-like appearance: The positive electrode pellet 32, separator 34, and negative electrode pellet 33 are placed in the face-to-face arrangement inside a sealing case 35 of circular half shell form, liquid electrolyte is injected, a gasket 36 is fitted to a lateral periphery of the sealing case 35, a cap case 31 is coupled onto the sealing case, and the open end edge of the cap case 31 is crimped or bent inwards so as to tightly seal the battery inner space.

Batteries having such electrode plate structure as described above wherein one positive electrode pellet 32 and one negative electrode pellet 33 are arranged face-to-face with each other cannot have a large discharge capacity because of the small reaction area where the positive and negative electrode plates face each other. To achieve a larger discharge capacity, positive and negative electrode plates must face each other in a larger area, and accordingly, for relatively larger batteries other than coin type batteries, various structures that enlarge the reaction area have widely been adopted in an attempt to increase the battery energy density in high rate discharge performance. There is, for example, a layered structure in which a plurality of positive and negative electrode plates are layered upon one another with separators interposed therebetween. Another example is a coiled structure in which strips of positive and negative electrode plates are coiled together with a separator interposed therebetween. The discharge capacity of coin type battery could be increased if electrode plates of such a layered or coiled structure were accommodated in a coin-shaped, flat case. In fact, the applicants of the present invention have proposed a battery containing an electrode plate group of a coiled structure in a coin-shaped, flat case in Japanese Patent Laid-Open Applications Nos. 2000-241678 and 2000-241679.

This electrode plate group of the coiled structure is constructed as shown in FIG. 10A and FIG. 10B: A positive electrode plate 7 consists of a plurality of positive electrode layer faces 17a-17e coupled together by connecting pieces 19a-19d, and a negative electrode plate 8 consists of a plurality of negative electrode layer faces 18a-18e that are larger than the positive electrode layer faces 17a-17e and coupled together by connecting pieces 20a-20d. They are coiled around with a separator interposed between them into a flat shape so as to be accommodated in a circular case. The resultant flat shape electrode plate group 1 appears as shown in FIG. 11. As shown in FIG. 12, this electrode plate group 1 is encased in a sealing case 5, a negative electrode lead 16 is welded to an inner face of the sealing case 5, and a positive electrode lead 15 is welded to a cap case 4. The sealing case 5 is then filled with liquid electrolyte. A gasket 6 is fitted to a lateral periphery of the sealing case 5, the cap case 4 is coupled thereon, and the open end edge of the cap case 4 is crimped so as to tightly seal the battery inner space. Such coin type battery can be constructed both as a lithium primary battery and rechargeable battery. Such a small and flat shape battery capable of outputting a large discharge current can contribute to realization of even smaller portable electronic devices and the like with higher functionalities.

One problem is that, in the manufacture of the electrode plate group 1, the positive and negative electrode plates 7, 8 are not fixed in position relative to each other, and they can easily be displaced in the process step of coiling them into a flat shape. If the positive electrode layer faces 17a-17e upon the negative electrode layer faces 18a-18e are largely offset because of the displacement during the coiling process, there is a risk of internal short-circuiting caused by dendritic growth of lithium. Since the coin type battery contains a coiled electrode plate group 1 in a small, flat case, internal short-circuiting may also be caused if the electrode plates are not in register, as they may contact the sealing case 5 upon an impact of a falling accident or the like.

Accordingly, it is necessary to detect the presence of discrepancy in position between the positive electrode layer faces 17a-17e and negative electrode layer faces 18a-18e, which is, however, not possible after the positive and negative electrode plates 7, 8 have been coiled around with the separator therebetween, because the finished electrode plate group 1 is covered by the separator that is unified with the electrode plates. Thus there is a need to inspect, by some means, whether there is a discrepancy in position between the positive electrode layer faces 17a-17e and negative electrode layer faces 18a-18e, so that only the electrode plate groups 1 that are within a permissible range of positional displacement are used for assembling the batteries.

An object of the present invention is to provide a coin type battery having a feature that enables detection of positional displacement between positive and negative electrode plates of an assembled electrode plate group, and a manufacturing method of this coin type battery.

DISCLOSURE OF THE INVENTION

To achieve the above object, according to a first aspect of the present invention, there is provided a coin type battery comprising:

a strip of positive electrode plate formed of a plurality of positive electrode layer faces coupled together by a plurality of connecting pieces;

a strip of negative electrode plate formed of a plurality of negative electrode layer faces coupled together by a plurality of connecting pieces;

a separator interposed between the positive electrode plate and the negative electrode plate, the positive electrode plate and negative electrode plate being folded at the respective connecting pieces and coiled around into an electrode plate group of flat form such that the positive electrode layer faces and the negative electrode layer faces are alternately layered upon one another with the separator interposed therebetween;

a sealing case forming an inner space together with a gasket and a cap case for accommodating the electrode plate group, characterized in that the positive electrode plate and the negative electrode plate are respectively formed with positional discrepancy detecting cut-outs for detecting positional displacement between the positive electrode layer faces and the negative electrode layer faces when both electrode plates are coiled around. Preferably, the positional discrepancy detecting cut-outs are holes, centers of which conform to each other when the positive electrode plate and negative electrode plate are coiled around in exact register. Alternatively, the positional discrepancy detecting cut-outs can be notches of same or similar form, peripheral edges of which conform to each other when the positive electrode plate and negative electrode plate are coiled around in exact register.

According to the above structure, after coiling around the positive and negative electrode plates formed with positional discrepancy detecting cut-outs into the electrode plate group of flat form, X-ray inspection is carried out to detect positional displacement in the positive and negative electrode plates based on the positional relationship between the positional discrepancy detecting cut-outs in the electrode plates. Non-conforming electrode plate groups in which positional displacement has occurred may cause short circuits if encased and assembled into coin type batteries. The inspection enables only the electrode plate groups that fall in a permissible range of positional displacement to be assembled into coin type batteries. Thus, coin type batteries constructed with coiled electrode plates are manufactured with a good yield.

According to a second aspect of the invention, there is also provided a coin type battery comprising:

a strip of positive electrode plate formed of a plurality of positive electrode layer faces coupled together by a plurality of connecting pieces;

a strip of negative electrode plate formed of a plurality of negative electrode layer faces coupled together by a plurality of connecting pieces;

a separator interposed between the positive electrode plate and the negative electrode plate, the positive electrode plate and negative electrode plate being folded at the respective connecting pieces and coiled around into an electrode plate group of flat form such that the positive electrode layer faces and the negative electrode layer faces are alternately layered upon one another with the separator interposed therebetween;

a sealing case forming an inner space together with a gasket and a cap case for accommodating the electrode plate group, characterized in that the electrode plate group is provided, at least in one positive electrode layer face and one negative electrode layer face that face each other at a coiling finish end, or at least in the positive electrode layer faces and the negative electrode layer faces that face each other at a coiling start end and at a coiling finish end, with positional discrepancy detecting cut-outs for detecting positional displacement between the positive electrode layer face and the negative electrode layer face when both electrode plates are coiled around. The positional discrepancy detecting cut-outs can be either holes or notches as mentioned above.

According to the above structure, after coiling around the positive and negative electrode plates formed with positional discrepancy detecting cut-outs in their respective layer faces into the electrode plate group, X-ray inspection is carried out to detect positional displacement in the positive and negative electrode plates based on the positional relationship between the positional discrepancy detecting cut-outs in the opposing positive and negative electrode layer faces. Thus, short circuits that may occur after encasing and assembling the electrode plate group into the coin type battery is prevented, and coin type batteries constructed with coiled electrode plates are manufactured with a good yield.

In the battery above, the positive electrode plate and the negative electrode plate are coiled around such that a first positive electrode layer face is placed upon a negative electrode layer face that is second from the coiling start end; a first negative electrode layer face is folded back at a first connecting piece upon the first positive electrode layer face; the first negative electrode layer face is further folded back at a second connecting piece upon a second positive electrode layer face. The positional discrepancy detecting cut-outs are formed in the first negative electrode layer face and the first and second positive electrode layer faces that face the first negative electrode layer face. The layer faces of positive and negative electrode plates are thus layered alternately, and a positional discrepancy at the coiling start end is reliably detected.

The negative electrode layer faces are formed larger than the positive electrode layer faces, and the positional discrepancy detecting cut-outs are formed as holes or notches. The holes or notches formed in either one of the positive electrode layer faces and the negative electrode layer faces are larger than the holes or notches formed in the other, and their positional relationship is determined based on a permissible range of positional displacement between the positive electrode plate and the negative electrode plate. The positional relationship, i.e., whether the smaller detecting hole is located inside the larger detecting hole, can be detected from transmitted X-ray images obtained by irradiating X-rays to the electrode plate group in the layering direction. X-ray inspection thus enables determination of whether the positional displacement is within the permissible range or not.

The positional discrepancy detecting cut-outs respectively formed in the first and the second positive electrode layer faces are formed in different sizes. Thereby, a positional discrepancy between the first and second layer faces of the positive electrode at its coiling start end is detected.

The detecting holes formed in the positive electrode layer faces are larger than the holes in the negative electrode layer faces. That way, it is prevented that the negative electrode layer face is offset from the positive electrode layer face. When constructing the battery as a lithium rechargeable battery, this will prevent dendritic growth of lithium.

The positional discrepancy detecting cut-outs formed in the positive electrode layer face and the negative electrode layer face that face each other at the coiling start end and the positional discrepancy detecting cut-outs formed in the positive electrode layer face and the negative electrode layer face that face each other at the coiling finish end are located at different positions on the positive electrode layer faces and the negative electrode layer faces. Thereby, positional displacement at the coiling start end and the coiling finish end is detected at the same time in the X-ray inspection.

According to a third aspect of the invention, there is further provided a method of manufacturing a coin type battery, comprising:

folding a strip of positive electrode plate formed of a plurality of positive electrode layer faces coupled together by a plurality of connecting pieces, and a strip of negative electrode plate formed of a plurality of negative electrode layer faces coupled together by a plurality of connecting pieces at the respective connecting pieces and coiling it around into an electrode plate group of flat form such that the positive electrode layer faces and the negative electrode layer faces are alternately layered upon one another with a separator interposed therebetween;

accommodating the electrode plate group into a sealing case;

injecting liquid electrolyte thereinto;

placing a cap case onto the sealing case via a gasket; and crimping the cap case to seal the inside of the sealing case, characterized in that the positive electrode plate and the negative electrode plate are respectively formed with positional discrepancy detecting cut-outs for detecting positional displacement between the positive electrode layer faces and the negative electrode layer faces when both electrode plates are coiled around;

after coiling around the positive electrode plate and the negative electrode plate into the electrode plate group, X-rays are irradiated thereto in a direction in which the electrode plates are layered so as to obtain transmitted X-ray images of the electrode plate group;

a positional discrepancy is detected, by processing the images, between the positional discrepancy detecting cut-outs in the positive electrode layer faces and the positional discrepancy detecting cut-outs in the negative electrode layer faces; and when the detected positional discrepancy is within a predetermined permissible range, the electrode plate group is accommodated in the sealing case.

According to the above method of manufacturing coin type batteries, electrode plate groups formed with positional discrepancy detecting cut-outs are subjected to X-ray inspection for selecting the groups in which no positional displacement has occurred between the positive and negative electrode plates, and these groups are encased and assembled into coin type batteries. Short circuits that may be caused by positional displacement after completing the batteries is thus prevented, and coin type batteries constructed with electrode plates of a coiled structure are manufactured with a good yield.

BRIEF DESCRIPTION OF THE DRAWINGS

FIG. 2A is a top plan view of a negative electrode plate, and FIG. 2B is a top plan view of a positive electrode plate;

FIG. 7A is a top plan view of a negative electrode plate according to another embodiment of the invention, and FIG. 7B is a top plan view of a positive electrode plate of the same;

BEST MODE FOR CARRYING OUT THE INVENTION

Preferred embodiments of the present invention will be described below with reference to the accompanying drawings for a better understanding of the present invention. It should be noted that the embodiments described below are merely examples of carrying out the invention and should not pose any limitation on the technical scope of the invention.

Figure 1:
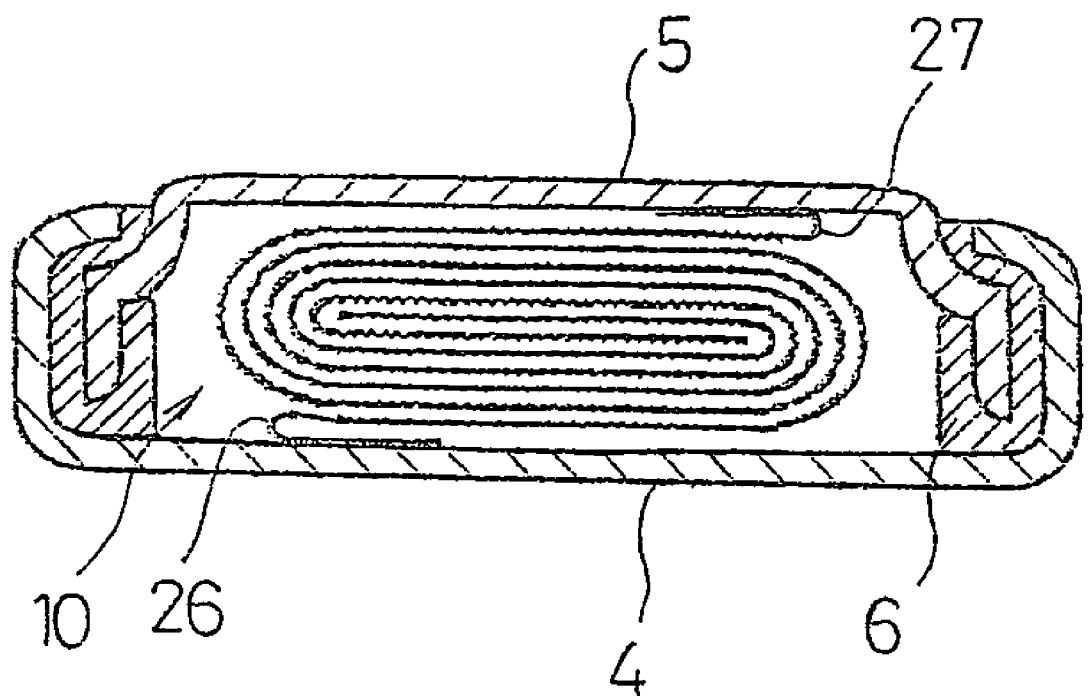
FIG. 1 is a cross section illustrating the structure of a coin type battery according to one embodiment of the present invention.

The coin type battery according to this embodiment is manufactured through the following process steps: An electrode plate group 10 is encased in a sealing case 5 of circular half shell form as shown in FIG. 1, a positive electrode lead 26 and a negative electrode lead 27 drawn out from the electrode plate group 10 are welded to a cap case 4 and the sealing case 5, respectively, liquid electrolyte is injected, a gasket 6 is fitted to a lateral periphery of the sealing case 5, the cap case 4 is coupled upon the gasket 6, and the open end edge of the cap case 4 is crimped or bent inwards so as to tightly seal the battery inner space.

Figure 3A:
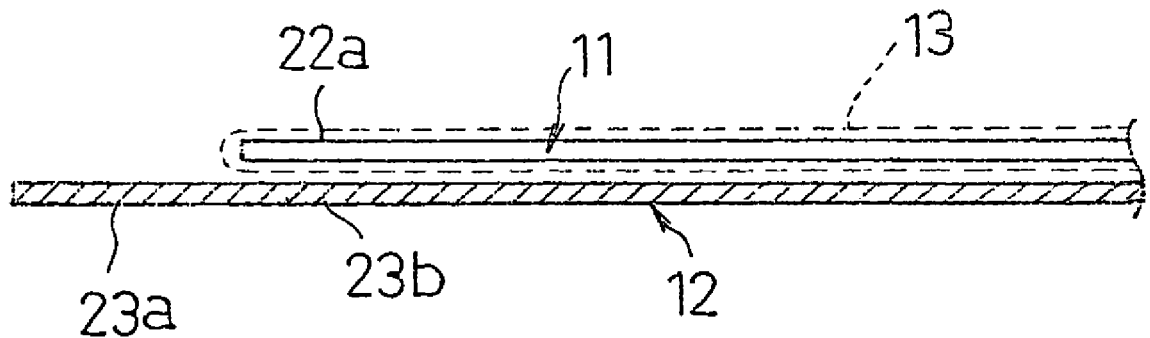
FIG. 3A to FIG. 3C are model views illustrating a coiling process step in order.
Figure 3B:
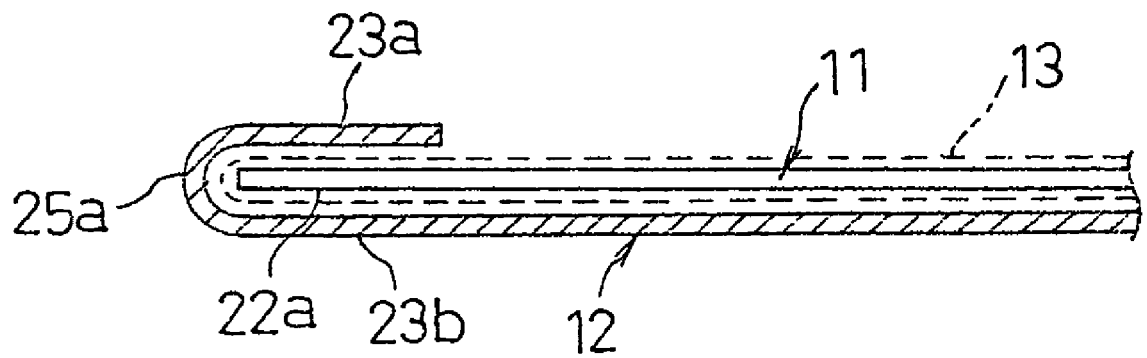
Figure 3C:
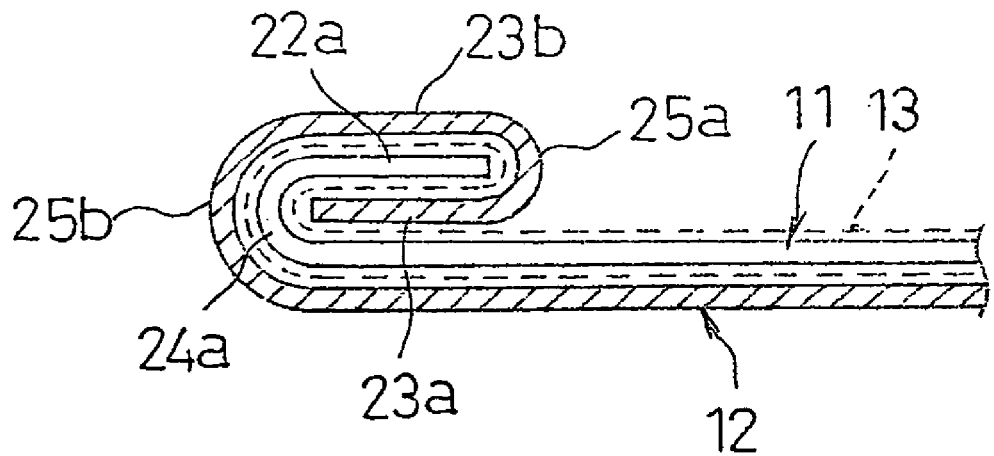

The electrode plate group 10 is constructed in a flat coiled shape with wound positive and negative electrode plates 11, 12 and a separator interposed therebetween: The negative electrode plate 12 consists of six negative electrode layer faces 23a-23f coupled together by connecting pieces 25a-25e and the negative electrode lead 27 formed at the coiling finish end, as shown in FIG. 2A. The positive electrode plate 11 consists of five positive electrode layer faces 22a-22e that are smaller than the negative electrode layer faces 23a-23f and coupled together by connecting pieces 24a-24d and the positive electrode lead 26 formed at the coiling finish end, as shown in FIG. 2B. Coiling is achieved by folding the electrode plates at their connecting pieces 24a-24d and 25a-25e such that the positive electrode layer faces 22a-22e and negative electrode layer faces 23a-23f are alternately layered upon one another with the separator in between them. The following is a description of how the positive electrode layer faces 22a-22e and negative electrode layer faces 23a-23f are alternately layered upon one another with the separator in between them in the coiling process steps:

As shown in FIG. 3A, the separator 13 illustrated by broken lines is provided to cover both faces of the positive electrode plate 11, which is placed upon the negative electrode plate 12, such that the first positive electrode layer face 22a is located upon a negative electrode layer face 23b that is second from the coiling start end. The negative electrode layer face 23a is then folded back at the connecting piece 25a on the positive electrode layer face 22a as shown in FIG. 3B. This portion where the positive electrode layer face 22a is sandwiched between the negative electrode layer faces 23a, 23b via the separator 13 on both sides is folded back at the connecting pieces 24a and 25b on the next positive electrode layer face 22b that is superposed on the negative electrode layer face 23c as shown in FIG. 3C. This folding process is repeated towards the coiling finish end, until the positive and negative electrode plates 11, 12 are coiled around in a flat shape into an electrode plate group 10 shown in FIG. 4, with the separator 13 therebetween.

When coiling around the positive and negative electrodes 11, 12 into a flat electrode plate group 10 as described above, if the electrode plates 11, 12 are not in register, there may be a discrepancy in face-to-face positions of the positive electrode layer faces 22a-22e and negative electrode layer faces

23a-23f. If part of the positive electrode layer faces 22a-22e upon the negative electrode layer faces 23a-23f is offset because of the positional discrepancy, there are risks of internal short-circuiting caused by dendritic growth of lithium, or of internal short-circuiting across the electrode plates and sealing case 5 upon an impact of a falling accident or the like. Consequently, it is necessary to detect whether there is a positional discrepancy in the finished electrode plate group 10. For this purpose, the positive and negative electrode plates 11, 12 are respectively provided with positional discrepancy detecting holes or cut-outs 41a, 41b, 42 and 43, 44 in the positive electrode layer faces 22a, 22b and negative electrode layer face 23a that face each other at the coiling start end, and in the positive electrode layer face 22e and negative electrode layer face 23f that face each other at the coiling finish end.

Figure 4:
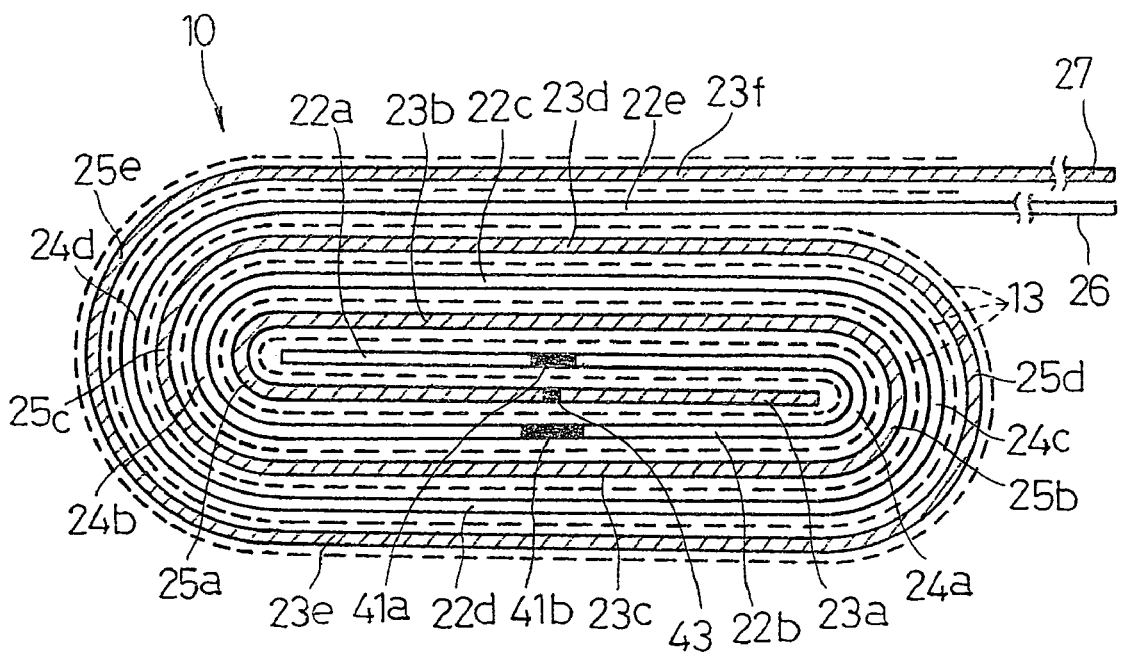
FIG. 4 is a model view of an electrode plate group in the coiled state.
Figure 5:
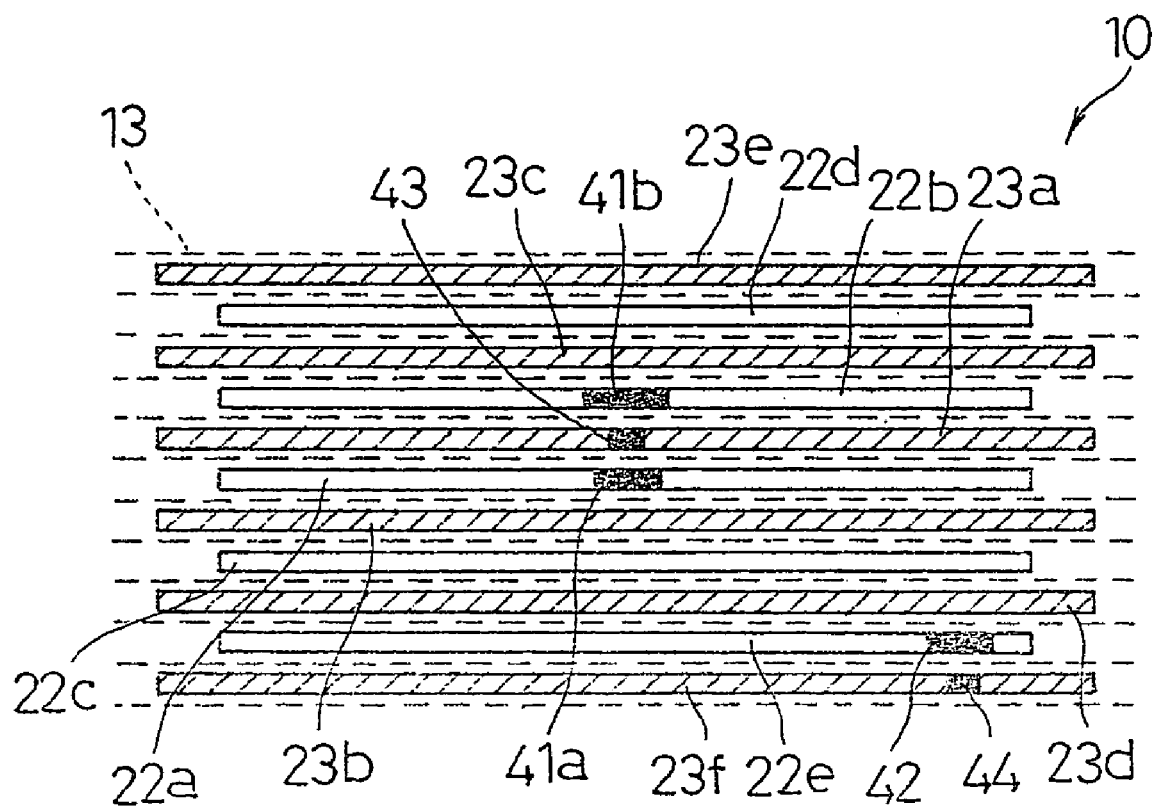
FIG. 5 is a model view illustrating the face-to-face arrangement of positional discrepancy detecting holes.

Since the negative electrode layer face 23a faces the positive electrode layer faces 22a, 22b at the coiling start end as described above, when the electrode plates are coiled together in exact register, the positional discrepancy detecting hole 43 in the negative electrode layer face 23a is concentric with the holes 41a, 41b respectively formed in the positive electrode layer faces 22a, 22b as shown in FIG. 4 and FIG. 5. At the coiling finish end where the positive electrode layer face 22e faces the negative electrode layer face 23f, the positional discrepancy detecting hole 44 in the negative electrode layer face 23f is concentric with the hole 42 formed in the positive electrode layer face 22e as shown in FIG. 5, when the electrode plates are coiled together in exact register. FIG. 5 is a model view illustrating a cross section that is orthogonal to the cross section of FIG. 4. The purpose of presenting a cross section in this direction is to illustrate the positions of the detecting holes at the coiling start end and coiling finish end that are offset in a direction orthogonal to the coiling direction.

Since the diameter of the layer faces 23a-23f of the negative electrode plate 12 in the direction of its width is larger than that of the layer faces 22a-22e of the positive electrode plate 11, a positional discrepancy of the positive electrode plate 11 in the width direction of the negative electrode plate 12 should be allowable in physical terms by the difference in the widthwise diameter. The widthwise diameter of the negative electrode layer faces 23a-23f in this embodiment is 24.0 mm, while that of the positive electrode layer faces 22a-22e is 22.0 mm, and therefore a positional discrepancy of positive electrode layer faces 22a-22e on the negative electrode layer faces 23a-23f should be allowable by 1.0 mm on both sides in the widthwise direction. However, it is preferable to ensure that positive electrode layer faces 22a-22e are placed exactly upon the negative electrode layer faces 23a-23f in order to suppress the dendritic growth of lithium. If the edges of the positive electrode layer faces 22a-22e conform to the edges of the negative electrode layer faces 23a-23f, it is likely that a short circuit is formed upon an impact of a falling accident or the like. For this reason, in this embodiment, the permissible range of positional discrepancy is determined by the diameters of the detecting holes 41a, 41b, 42 in the positive electrode and those 43, 44 in the negative electrode.

The diameter of the detecting holes 41a, 41b, 42 in the positive electrode is set larger than the detecting holes 43, 44 in the negative electrode, and if the detecting holes 43, 44 are located inside the detecting holes 41a, 41b, 42 with a certain clearance, it is judged that the positional discrepancy is within the permissible range. In this embodiment, the diameter of the detecting holes 41a, 42 in the positive electrode is 3.2 mm, and that of the hole 41b is 4.2 mm. The diameter of the detecting hole 43 in the negative electrode is 1.5 mm. When the detecting hole 41a in the positive electrode is not inside its detecting hole 41b, it is assumed that there has been a positional discrepancy when folding the positive electrode plate 11 at its connecting piece 24a shown in FIG. 3C. If the positional discrepancy between the centers of the detecting hole 41a in the positive electrode and the hole 43 in the negative electrode at the coiling start end is within 0.65 mm and if the discrepancy between the centers of the hole 42 in the positive electrode and the hole 44 in the negative electrode is within 0.65 mm, they are within the permissible range.

Figure 6:
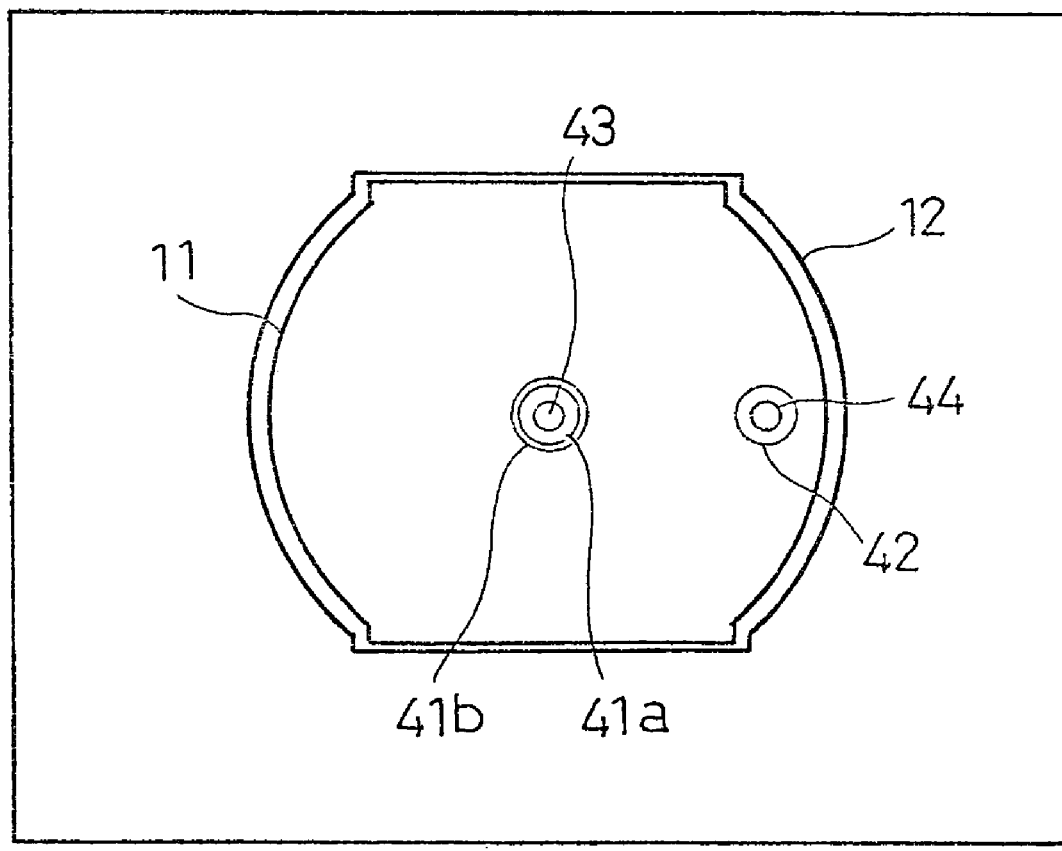
FIG. 6 is an image view of an electrode plate group subjected to X-ray inspection.

Detection of positional discrepancy using these detecting holes 41a, 41b, 42 and 43, 44 in the positive and negative electrodes is achieved by irradiating X-rays to the complete electrode plate group 10 and by processing the transmitted X-ray images of the electrode plate group 10. FIG. 6 is an example of an image obtained by X-ray transmission; it shows a state in which both electrode plates are in exact register where the centers of the detecting holes 41a, 41b, 42 in the positive electrode and those of the detecting holes 43, 44 in the negative electrode coincide with each other. Since the detecting holes 41a, 41b in the positive electrode and the hole 43 in the negative electrode at the coiling start end and the detecting holes 42, 44 at the coiling finish end are formed at different positions, it is possible to separately detect a positional discrepancy at the coiling start/finish ends.

Determination of non-conforming electrode plate groups 10 using the transmitted X-ray images can be made based on whether a positional discrepancy is detected between the centers of the detecting hole 41a in the positive electrode and of the hole 43 in the negative electrode, and between the centers of the detecting hole 42 in the positive electrode and of the hole 44 in the negative electrode. Alternatively, it can be made based on whether the detecting hole 41a in the positive electrode is located inside its detecting hole 41b and by detecting the minimum distance between the peripheral edges of the detecting hole 41a in the positive electrode and the hole 43 in the negative electrode, and between the peripheral edges of the detecting hole 42 in the positive electrode and the hole 44 in the negative electrode.

The diameter of the detecting holes 41a, 42 in the positive electrode is 3.2 mm in this embodiment as mentioned above, while the diameter of the detecting holes 43, 44 in the negative electrode is 1.5 mm. In the case where the inspection is based on detected minimum distances between the peripheral edges of the detecting hole 41a in the positive electrode and the hole 43 in the negative electrode, and between the peripheral edges of the detecting hole 42 in the positive electrode and the hole 44 in the negative electrode, if it is detected from a processed image of transmitted X-rays that these minimum distances are 0.2 mm or more, it is determined that the positional discrepancy is within the permissible range, and the electrode plate group 10 is identified as a conforming product that can be assembled into a coin type battery. If the detected minimum distances are 0.2 mm or less, then the electrode plate group 10 is disposed as a non-conforming product in which large positional displacement has occurred.

In the embodiment described above, the holes for detecting positional displacement formed at the coiling start/finish ends are offset from each other in a direction orthogonal to the coiling direction, but they may be offset from each other along the coiling direction.

In the embodiment described above, the holes 41a, 41b, 42, 43, 44 or cut-outs for detecting positional displacement are of circular form, but they can be in other forms such as squares. Alternatively, they can be formed as notches 71a, 71b, 72, 73, 74 as shown in FIG. 7A and FIG. 7B. The positional discrepancy detecting cut-outs may be formed only in the positive and negative electrode layer faces that face each other at the coiling finish end of the electrode plate group. In the case where the positional discrepancy detecting cut-outs are formed both at the coiling start/finish ends of the electrode plate group, they may be provided only to the first positive electrode layer face 22a, unlike the case shown in FIG. 2A and FIG. 2B in which the first layer face 22a and the second layer face 22b of the positive electrode are both formed with the cut-outs. Forming notches has an advantage over the forming of holes in that electrode plate punching die set can be simplified.

The positive and negative electrode plates 11, 12 shown in FIG. 7A and FIG. 7B have basically the same configuration as those illustrated in FIG. 2A and FIG. 2B; the negative electrode layer faces are larger than the positive electrode layer faces. At the coiling start end, positional discrepancy detecting cut-outs or notches 71a, 71b and 73 are formed in a right-angled triangular shape in the layer faces 22a, 22b of the positive electrode plate 11 and in the layer face 23a of the negative electrode plate 12, respectively, at matching positions. In the positive electrode layer face 22e and negative electrode layer face 23f that face each other at the coiling finish end, positional discrepancy detecting cut-outs or notches 72, 74 are formed in a right-angled triangular shape. The notches 71a, 71b, 73 and 72, 74 shown in FIG. 7A and FIG. 7B are all of the same shape, so that, when the positive and negative electrode plates 11, 12 are coiled around in exact register, the straight portions of matching notches are substantially in parallel to each other. Alternatively, matching notches can be formed in shapes analogous to each other.

Figure 8:
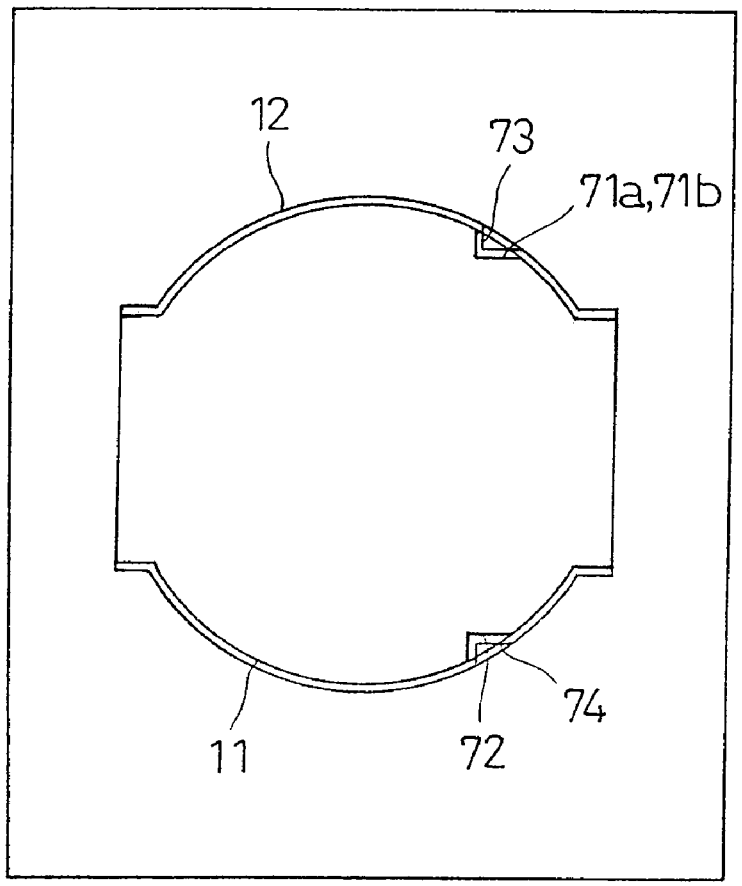
FIG. 8 is an image view of the electrode plate group of the same embodiment subjected to X-ray inspection.
Figure 9:
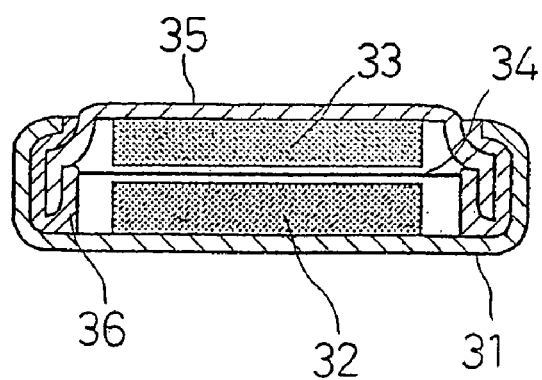
FIG. 9 is a cross section illustrating the structure of a conventional coin type battery.
Figure 10A:
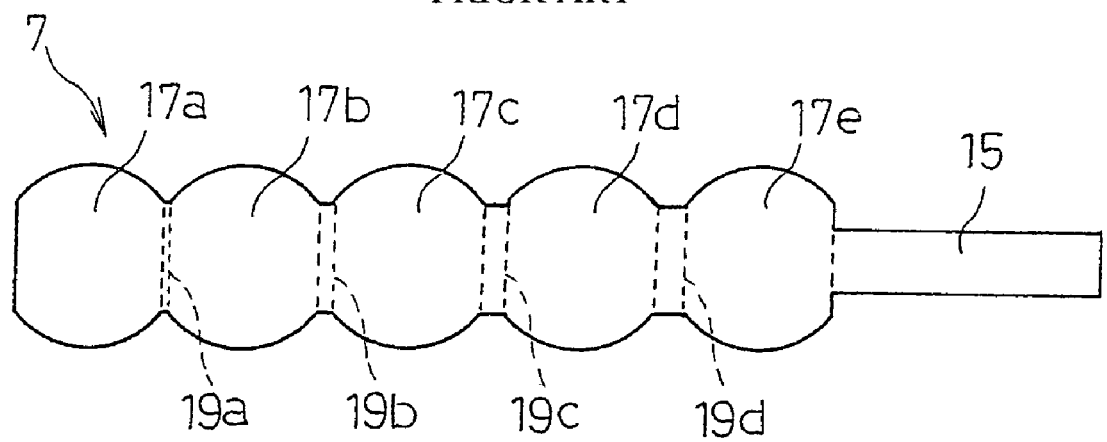
FIG. 10A is a top plan view of a conventional negative electrode plate.
Figure 10B:
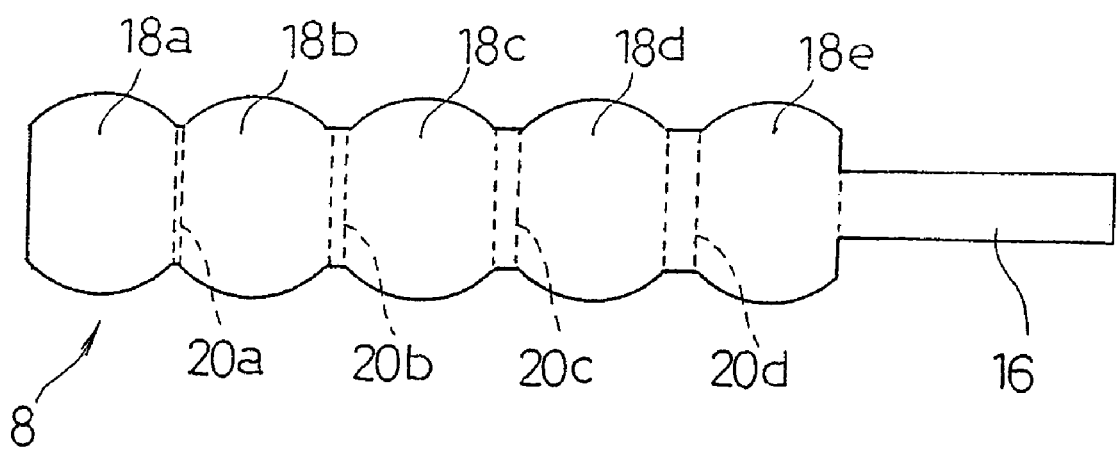
FIG. 10B is a top plan view of a conventional positive electrode plate.
Figure 11:
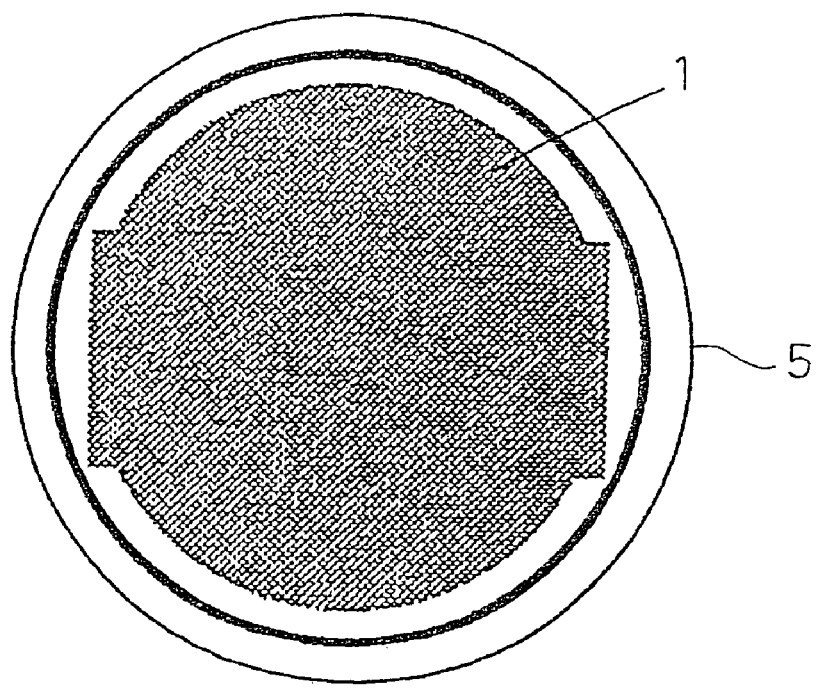
FIG. 11 is a top plan view of a conventional electrode plate group of a coiled structure.
Figure 12:
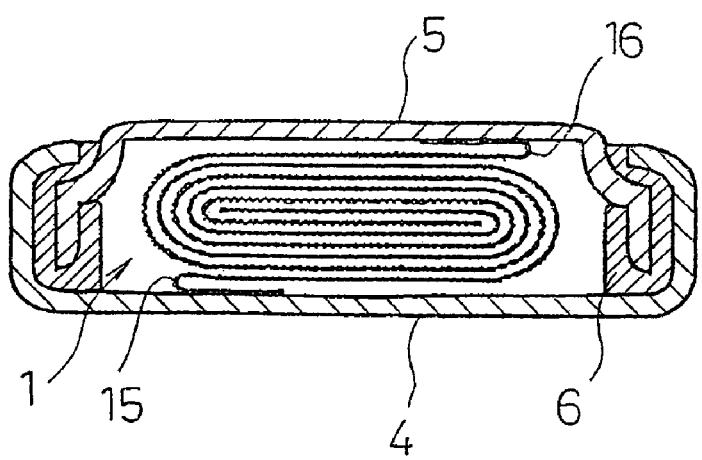
FIG. 12 is a cross section of a conventional coin type battery that uses the electrode plate group of the coiled structure.

FIG. 8 illustrates an image obtained by transmitted X-rays of an electrode plate group having these positive and negative electrode plates 11, 12. It can be seen from the drawing that a positional discrepancy in the electrode plate group at its coiling start/finish ends are detected based on the relative positional relationships between the corresponding detecting notches 71a, 71b, 73 and 72, 74. The notches can be in some other forms such as arcs or the like other than right-angled triangles.

INDUSTRIAL APPLICABILITY

As described above, according to the present invention, it is possible to detect positional displacement in a coiled electrode plate group that is applied to flat shaped batteries such as coin type batteries. It prevents short circuits caused by positional displacement of electrode plates, and is advantageously adopted for the manufacture of coin type batteries with a good yield.

The invention claimed is:

1. A method of manufacturing a coin battery, comprising:
   folding a strip of positive electrode plate formed of a plurality of positive electrode layer faces coupled together by a plurality of connecting pieces, and a strip of negative electrode plate formed of a plurality of negative electrode layer faces coupled together by a plurality of connecting pieces at the respective connecting pieces and coiling it around into an electrode plate group of flat form such that the positive electrode layer faces and the negative electrode layer faces are alternately layered upon one another with a separator interposed therebetween;
   accommodating the electrode plate group into a sealing case;
   injecting liquid electrolyte thereinto;
   placing a cap case onto the sealing case via a gasket; and
   crimping the cap case to seal the inside of the sealing case, characterized in that
   the positive electrode plate and the negative electrode plate are respectively formed with positional discrepancy detecting cut-outs for detecting positional displacement between the positive electrode layer faces and the negative electrode layer faces when both electrode plates are coiled around;
   after coiling around the positive electrode plate and the negative electrode plate into the electrode plate group, X-rays are irradiated thereto in a direction in which the electrode plates are layered so as to obtain transmitted X-ray images of the electrode plate group;
   a positional discrepancy is detected, by processing the images, between the positional discrepancy detecting cut-outs in the positive electrode layer faces and the positional discrepancy detecting cut-outs in the negative electrode layer faces; and
   when the detected positional discrepancy is within a predetermined permissible range, the electrode plate group is accommodated in the sealing case.

* * * * *